United States Patent [19]

Berge et al.

[11] Patent Number: 5,621,943
[45] Date of Patent: Apr. 22, 1997

[54] WINDSCREEN WIPER DEVICE FOR A ROTATING MOTOR SHAFT

[75] Inventors: Gilles Berge, Clairefontaine/Yvelines; Jean-Pierre Eustache, Antony; Joël Princet; Gilbert Bouy, both of Chatellerault, all of France

[73] Assignee: Valeo Systemes D'Essuyage, La Verriere, France

[21] Appl. No.: 395,040

[22] Filed: Feb. 27, 1995

[30] Foreign Application Priority Data

Feb. 28, 1994 [FR] France .................................. 94 02240

[51] Int. Cl.$^6$ ..................................................... B60S 1/34
[52] U.S. Cl. ........................ 15/250.34; 403/359; 403/282; 403/24
[58] Field of Search ............................ 15/250.34, 250.31, 15/250.35, 250.32, 250.3; 403/359, 282, 24, 263, 256, 259, 262, 93, 56

[56] References Cited

U.S. PATENT DOCUMENTS

| 2,020,244 | 11/1935 | Horton | 15/250.34 |
|---|---|---|---|
| 2,619,668 | 12/1952 | Sivacek | 15/250.35 |
| 2,736,053 | 2/1956 | Oishei et al. | 15/250.34 |
| 2,799,039 | 7/1957 | Oishei | 15/250.34 |
| 2,980,453 | 4/1961 | Nesson | 15/250.34 |
| 2,994,900 | 8/1961 | Smithers | 15/250.34 |
| 3,009,186 | 11/1961 | Lenz | 15/250.34 |
| 3,085,821 | 4/1963 | Ryck | 15/250.34 |
| 3,429,597 | 2/1969 | Krohm | 15/250.34 |
| 4,009,901 | 3/1977 | Barbee | 15/250.31 |
| 4,502,178 | 3/1985 | Ragot et al. | 15/250.34 |
| 4,550,469 | 11/1985 | Deutscher et al. | 15/250.34 |
| 4,566,146 | 1/1986 | Harbison | 15/250.34 |

FOREIGN PATENT DOCUMENTS

| 666076 | 7/1963 | Canada | 15/250.34 |
|---|---|---|---|
| 1162886 | 4/1958 | France | 15/250.34 |
| 491603 | 6/1992 | France . | |
| 2692536 | 12/1993 | France . | |
| 3319867 | 12/1984 | Germany | 15/250.34 |
| 3643475 | 6/1988 | Germany | 15/250.34 |
| 613795 | 12/1948 | United Kingdom | 15/250.34 |
| 644595 | 10/1950 | United Kingdom . | |
| 953850 | 4/1964 | United Kingdom | 15/250.352 |

OTHER PUBLICATIONS

Abstract of Japan Publication No. JP60088663, Oct. 19, 1973.

Primary Examiner—Gary K. Graham
Attorney, Agent, or Firm—Morgan & Finnegan, LLP

[57] ABSTRACT

The invention proposes a windscreen wiper device of the type comprising a rotating motor shaft (12) and a driving head (10) on which a windscreen wiper arm is articulated, and of the type comprising coupling means between the driving head (10) and the free end (28) of the motor shaft (12) which is mounted in a seat (22, 24) formed in the driving head (10), which comprise rotational coupling means by cooperation of shapes (42) and axial clamping means (38, 56) comprising a unit of the screw-nut type, characterised in that the seat (22) comprises a radial stop surface (23) which cooperates with a radial bearing surface (36) of the motor shaft (12) in order to define a precise axial position of the driving head (10) in relation to the motor shaft (12).

1 Claim, 4 Drawing Sheets

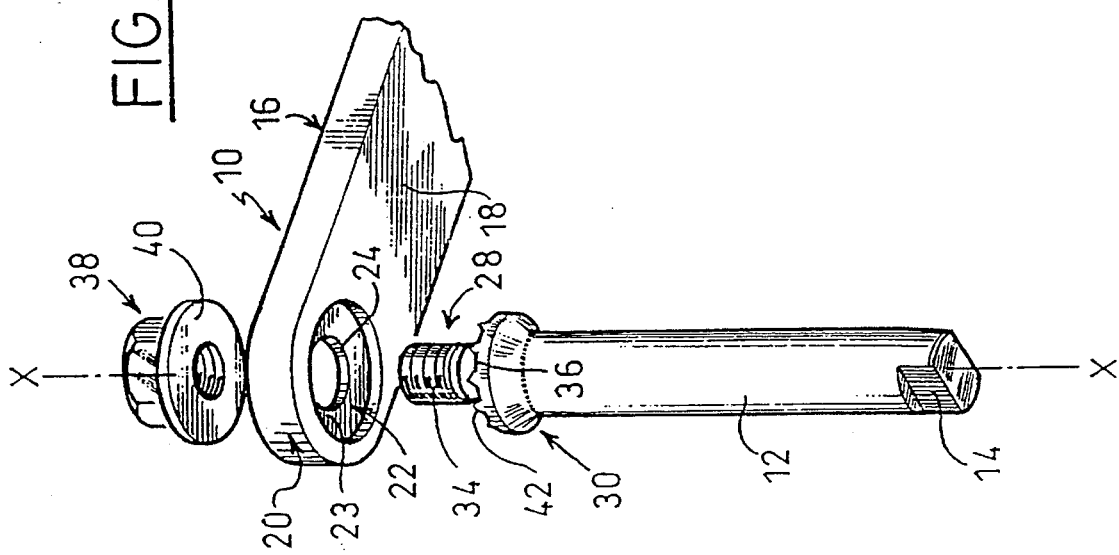
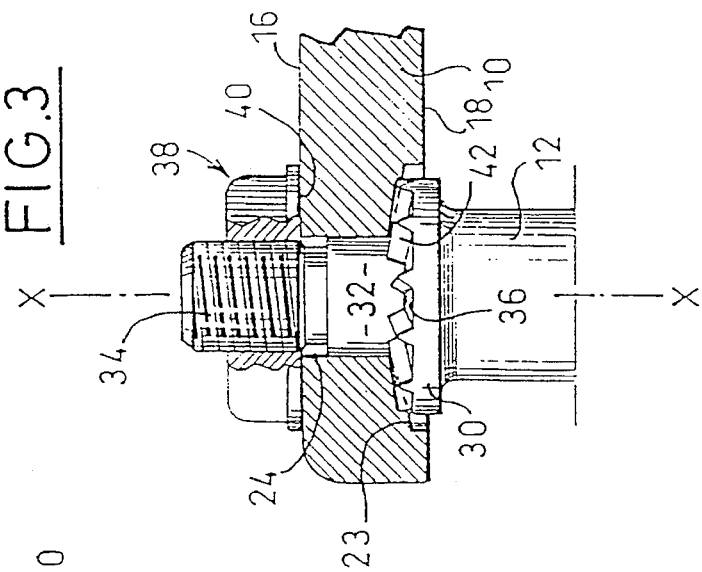
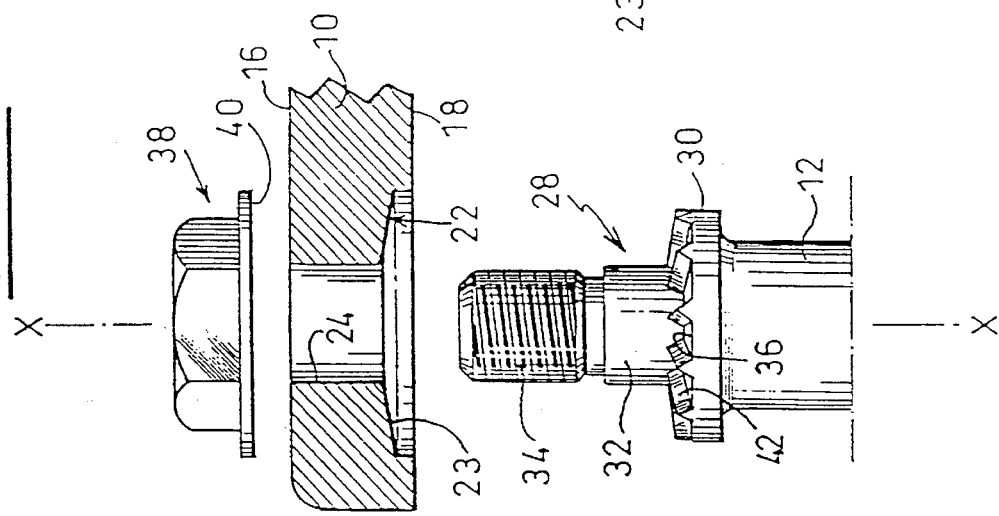

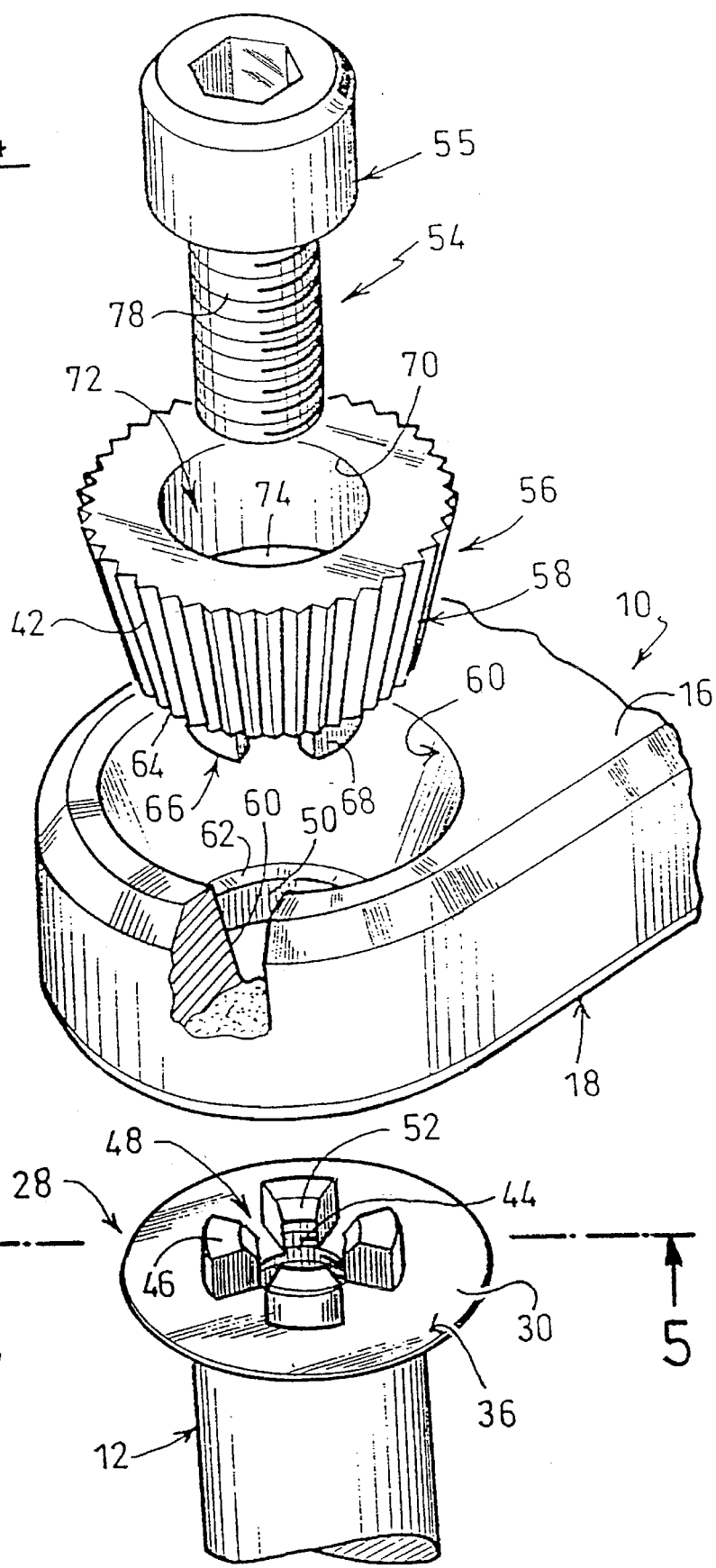

5,621,943

WINDSCREEN WIPER DEVICE FOR A ROTATING MOTOR SHAFT

FIELD OF THE INVENTION

The present invention relates to a windscreen wiper device.

The invention more particularly relates to a device of the type comprising a rotating motor shaft and a driving head on which a windscreen wiper arm is articulated, and of the type comprising coupling means between the driving head and the free end of the motor shaft which is mounted in a seat formed in the driving head, which comprise means for coupling in rotation by cooperation of shapes and axial clamping means comprising a unit of the screw-nut type.

BACKGROUND OF THE INVENTION

According to a known design, the end of the driving shaft comprises a conical section, the surface of which is provided with a series of raised catches which extend parallel to the axis, and a threaded end section.

The conical section is mounted in a recess having a complementary profile, with a smooth wall, formed in the driving head whereas the threaded end protrudes above the upper face of the driving head in order to be screwed into a clamping nut, the annular clamping face of which cooperates with the upper face of the driving head.

The clamping operation in the assembled position of the driving head due to the nut has the effect of causing penetration of the catches into the material forming the wall of the conical recess of the driving head.

The clamping force applied to the nut causes progressive penetration of the catches into the driving head and the catches become impressed into the wall in order to form the rotational driving means of the driving head by the motor shaft.

This particularly simple design has the drawback of varying the axial position of the driving head on the motor shaft as a function of the value of the clamping force, i.e. it does not enable a precise dimension of the driving head in relation to the motor shaft, and therefore in relation to the pane of glass to be wiped, to be determined.

The object of the present invention is to propose a new design of such a windscreen wider device which enables this drawback to be removed.

SUMMARY OF THE INVENTION

To achieve this object, the invention proposes a windscreen wiper device of the type mentioned above, characterised in that the seat comprises a radial stop surface which cooperates with a radial bearing surface of the motor shaft in order to define a precise axial position of the driving head in relation to the motor shaft.

According to other characteristics of the invention:

the radial bearing surface is formed on a collar of the bearing shaft disposed in the vicinity of its free end;

the radial stop surface is an annular stop surface disposed in the lower face of the driving head and through which the free end portion of the motor shaft passes;

the axial clamping means comprise a clamping member, one annular clamping face of which cooperates with an annular portion disposed opposite in the upper face of the driving head;

the radial stop surface comes to bear directly on the radial bearing surface;

the rotational coupling means by cooperation of shapes comprises a series of teeth formed on the free end of the motor shaft and which are angularly distributed in a regular manner around the axis of the shaft;

the teeth are formed on the radial bearing surface;

the seat is a countersinking which is formed in the lower face of the driving head and which is pierced in its center for the passage of the free end of the motor shaft;

the free end of the motor shaft is threaded and the clamping member is a nut;

the rotational coupling means comprise an intermediate rotational coupling component mounted in a recess formed in the driving head rotationally coupled to the motor shaft, through which the screw-nut unit passes, and the outer rotating wall of which comprises a series of teeth angularly distributed in a regular manner, which cooperate with the opposite wall of the recess;

the recess opens into the upper face of the driving head and the screw-nut unit ensures an indirect axial clamping of the driving head via the intermediate component;

the screw-nut unit comprises a screw, the clamping head of which comes to bear against the intermediate component, the body of which passes through the intermediate component and the threaded end of which is screwed into an internal screw thread formed in the end of the motor shaft;

the head of the screw is mounted in the portion with the larger diameter of a stepped bore formed in the intermediate component, the body of the screw passing through the portion with the smaller diameter;

the intermediate component comprises a toothed head, which extends axially beyond the said end annular face, which cooperates with a complementary toothed end formed at the free end of the motor shaft in order to ensure the rotational coupling between the motor shaft and the intermediate component;

the recess opens into the lower face of the driving head and the intermediate component comprises a radial collar, a first annular face of which bears against the stop surface formed in the lower face of the driving head and the second annular face of which bears against the radial bearing surface of the motor shaft;

the motor shaft successively comprises, towards its free end, a collar which delimits the radial bearing surface, a rotational driving section having a non-circular section which passes through a central opening having a complementary section and formed in the intermediate component, and a threaded section designed to cooperate with a clamping nut, the annular clamping face of which cooperates with the upper face of the driving head.

BRIEF DESCRIPTION OF THE INVENTION

Other characteristics and advantages of the invention will become apparent from reading the following detailed description, for the understanding of which reference will be made to the attached drawings in which:

FIG. 1 is an exploded perspective view of a first embodiment of a windscreen wiper device in accordance with the teachings of the invention;

FIG. 2 is an exploded axial sectional view of the components of the device illustrated on FIG. 1;

FIG. 3 is an axial sectional view of the device illustrated in the assembled and clamped position;

FIG. 4 is an exploded perspective view of a second embodiment of a windscreen wiper device in accordance with the teachings of the invention;

DESCRIPTION OF THE PREFERRED EMBODIMENTS

Figure 7:
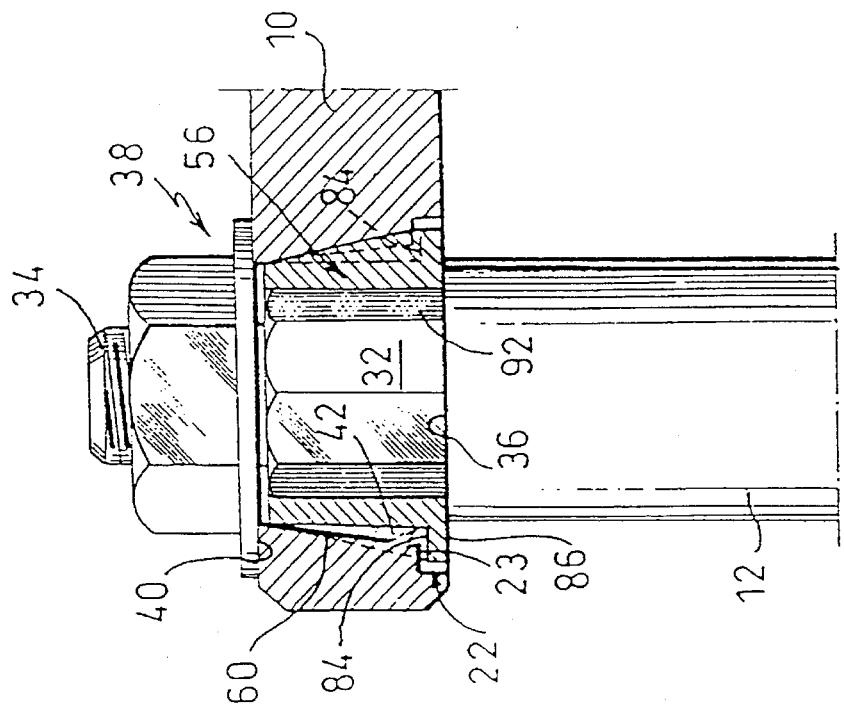
FIGS. 6 and 7 are views similar to those in FIGS. 4 and 5 which illustrate a third embodiment of a windscreen wiper device in accordance with the teachings of the invention.

In FIG. 1 has been represented a driving head 10 of a windscreen wiper arm, which is mounted in articulated fashion on the driving head around an axis roughly perpendicular to the rotational actuating axis X—X of head 10.

The actuation of the head 10 is ensured by means of a rotating motor shaft 12 which comprises means 14 for its rotational actuation, around the axis X—X, by a geared motor unit (not represented) in the figures.

The driving head is a metal casting having a general elongated shape which comprises an upper face 16 and a lower face 18, which are roughly parallel and plane.

In the vicinity of its rear end 20, the driving head 10 comprises a seat 22 produced in the form of a slightly conical countersinking formed in the lower face 18 which is extended by a central bore 24 which omens into the upper face 16 of the driving head 10. The conical countersinking defines a radial stop surface and a cylindrical outer edge surface which is substantially parallel to the axis of the motor shaft.

The free end portion 28 of the motor shaft 12 successively comprises, vertically from the bottom upwards when studying the figures, an outer radial collar 30, a smooth coupling section 32 and a threaded cylindrical end section 34.

The radial collar includes a slightly conical upper face 36 and cylindrical outer edge surface which is substantially parallel to the axis of the motor shaft 12. The slightly conical upper face 36 of the collar 30 defines, within the context of the invention, a radial annular bearing surface which, in the assembled and clamped position as illustrated on FIG. 3, comes into contact with the stop surface formed by the complementary slightly conical base 23 of the countersinking 22.

The coupling section 32 is designed to pass through the bore 24 whereas the threaded end section protrudes beyond the upper face 16 in order to be screwed into a clamping nut 38, the lower annular clamping face 40 of which is designed to cooperate with the opposite portion of the upper face 16 which surrounds the bore 24.

The rotational coupling means of the driving head 10 by the motor shaft 12 are formed by a series of teeth 42 which are formed raised on the radial bearing surface 36.

The teeth 42 are angularly distributed in a regular manner around the axis X—X and they extend radially in the direction of the axis.

Each tooth has a roughly triangular section and the teeth are spaced from one another by portions in the form of angular sectors of the radial bearing surface 36.

After assembling the components and their axial clamping by means of the nut 38, and as is illustrated on FIG. 3, it is noted that the teeth 42 have penetrated into the material forming the base 23 of the seat 22 and that this base 23 axially abuts, between the teeth 42, against the radial bearing surface 36, thus defining a precise axial position of the driving head 10 in relation to the driving shaft 12, i.e. a precise vertical dimension of the driving head in relation to the pane of glass to be wiped (not represented).

In the embodiment illustrated on the Figure, the radial collar 30 which delimits the radial annular bearing surface 36 and which comprises the rotational driving teeth 42 is produced in one piece by forging and impact forging with the body of the motor shaft 12.

According to a refinement, not represented on the figures, the collar 30 may be produced in the form of an intermediate component attached to the end 28 of the shaft 12, of the type which will be described and represented later with reference to the third embodiment illustrated in FIGS. 6 and 7.

Apart from the precision of the axial positioning of the driving head 10 in relation to the motor shaft 12, the design of the triangular, spaced teeth 42 enables, in the event of dismantling and reassembly, the driving head to be repositioned angularly in a precise manner in relation to the rotating shaft 12 by placing the teeth 42 to correspond with the impressions which they previously imprinted in the base 23 of the seat 22 during the first assembly and clamping operation.

The second embodiment illustrated in FIGS. 4 and 5 will now be described, in which components identical or similar to those illustrated in FIGS. 1 to 3 are designated by the same reference numbers.

Figure 5:
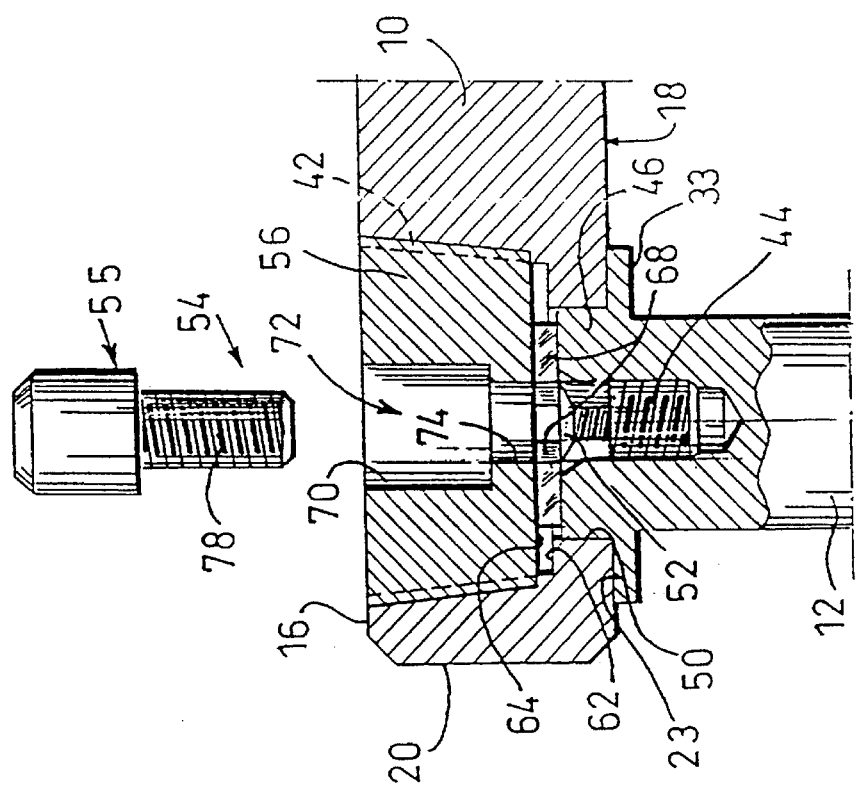
FIG. 5 is an axial sectional view of the device illustrated in FIG. 4, the components of which are illustrated in the assembled and clamped position.

In this embodiment, the collar 30 of the end portion 28 of the motor shaft 12 comprises an upper annular face 36 which defines a radial annular bearing surface which is designed to cooperate with a radial stop surface here formed directly by the opposite annular portion 23 of the lower face 18 of the driving head 10, as illustrated in FIG. 5.

The free end portion 28 of the motor shaft 12 comprises a central internal screw thread 44.

The end portion also comprises four studs 46 angularly distributed in regular manner which protrude axially beyond the radial annular bearing surface 36 and which form a toothed head 48 which is designed to be mounted in a bore of corresponding diameter 50 which opens into the lower face 18 of the driving head 10.

Each stud 46 comprises a chamfered edge 52 and a portion of the internal screw thread 44 in order to assist the introduction of a locking screw 54.

The rotational coupling means of the driving head 10 with the motor shaft 12 comprise an intermediate rotational coupling component 56.

The add-on component 56 is a solid rotating part, the outer wall 58 of which has a conical profile, the top of which is directed vertically downwards, when studying FIGS. 4 and 5, i.e. towards the motor shaft 12.

The conical wall 58 comprises a series of raised teeth 42 which are angularly distributed in a regular manner around the axis of the part 56 and which extend parallel to this axis on conical generatrices.

The add-on intermediate component 56 is designed to be mounted in a recess having a complementary conical profile 60, the wall of which is initially smooth, i.e. before the first assembly and clamping operation, and the base of which is formed by an annular clamping surface 62 which delimits the hole 50 and the recess 60, the latter opening into the upper face 16 of the driving head 10.

The intermediate rotational coupling component 56 comprises an end annular lower face 64 which is designed to come to bear axially against the annular clamping surface 62.

The intermediate rotational coupling component 56 also comprises a toothed head 66, which has a similar design to that of the toothed head 48 of the free end 28 of the motor shaft 12 which extends axially beyond the lower annular end surface 54 in order to be mounted, firstly in the hole 50, and secondly fitted between the studs of the toothed driving head 48 of the motor shaft 12 with studs 68, in order to ensure a rotational coupling of the intermediate component 56 with the motor shaft 12.

The four studs 68 of the driving head 66 are inserted between the studs 46 of the toothed driving head 48 but the end axial faces of these studs 46 and 68 do not axially bear against surface portions formed opposite on the intermediate component 56, nor on the free end 28 of the motor shaft 12.

The axial clamping of the unit is ensured by means of the screw 54, the head 56 of which is mounted in a portion of greater diameter 70 of a stepped bore 72 formed coaxially in the intermediate coupling component 56 and which is extended by a portion of smaller diameter 74 which enables the passage of the threaded stem 78 of the screw 56 which is designed to be screwed into the internal screw thread 44 formed in the free end of the motor shaft 12.

In the assembled and clamped position, as can be seen on FIG. 5, the radial annular stop zone 23 of the lower face 18 of the driving head 10 directly bears against the radial annular bearing surface 36 formed on the collar 30 of the motor shaft 12, thus ensuring a precise relative axial position of the driving head 10 in relation to the motor shaft 12, whereas the catches 42 formed on the intermediate rotational coupling component 56 have penetrated into the material which delimits the conical wall of the recess 60 and have left their impression.

The clamping force applied to the screw 56 brings about a greater or lesser axial penetration of the intermediate rotational coupling component 56 into the recess 60, but this has no effect on the relative axial position of the driving head 10 in relation to the motor shaft 12.

Figure 6:
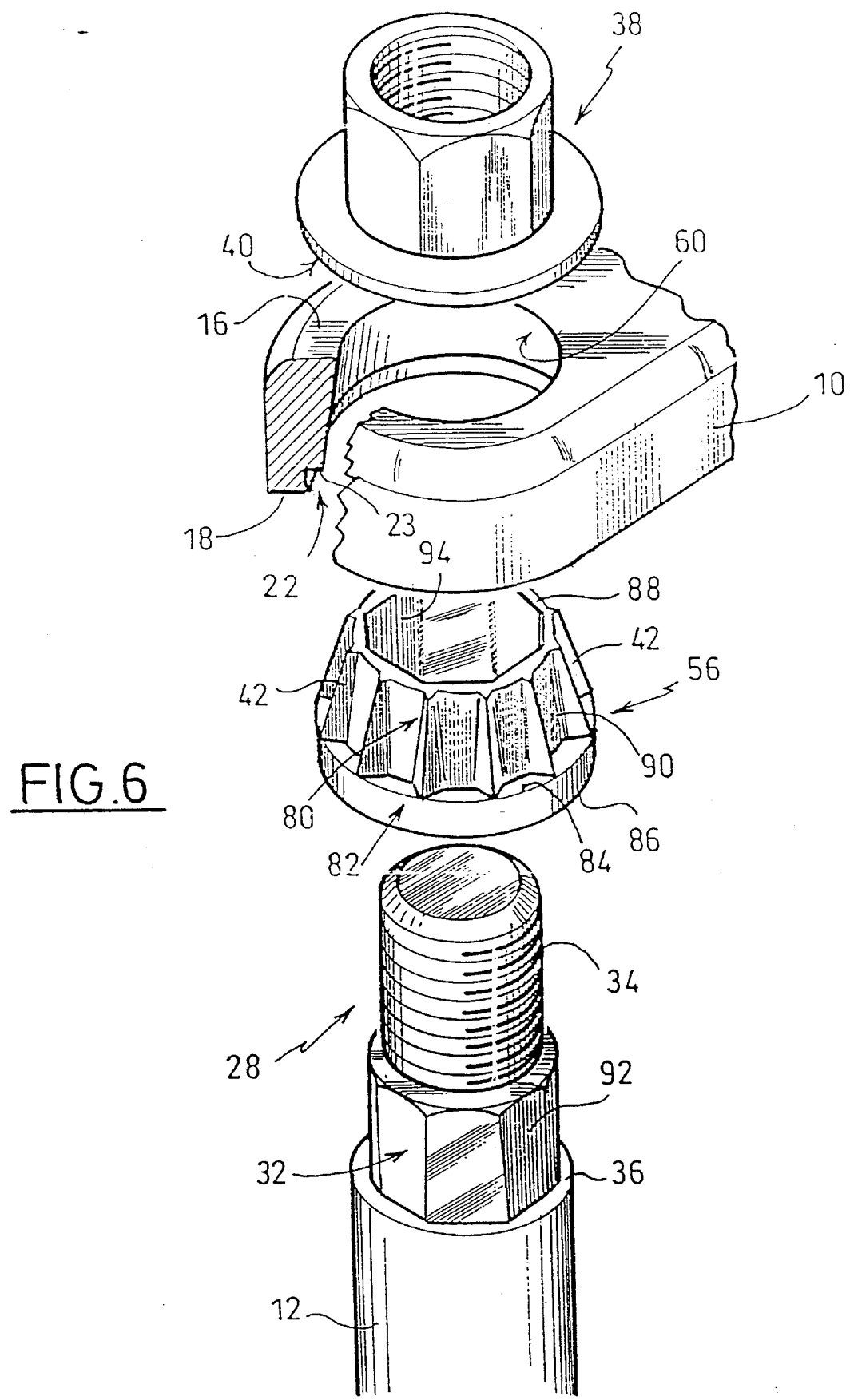

The third embodiment will now be described, which is illustrated in FIGS. 6 and 7 in which components identical or similar to those illustrated in FIGS. 1 to 5 are designated by the same reference numbers.

In this third embodiment, the bearing of the annular stop surface 23 formed in a lower countersinking 22 formed in the lower face 18 of the driving head 10 on the radial annular bearing surface 36 formed at the free end 28 of the motor shaft 12 is an indirect bearing which is performed via the intermediate coupling component 56.

For this purpose, the intermediate component 56 is disposed in a recess 60 which opens into the lower face 18 of the driving head 10 and which ends in the countersinking 22 defining the radial annular stop surface 23.

The intermediate component 56 is essentially composed of a roughly cylindrical annular skirt 80 which is extended at its lower part by an outer radial collar 82 which is designed to be mounted in the countersinking 22 and the upper annular radial face 84 of which is designed to come to bear axially against the radial annular stop surface 23.

The lower annular radial face 86 of the outer radial collar 82 is designed to come to bear against the radial annular bearing surface 36 formed on the free end 28 of the motor shaft 12.

The teeth 42 are distributed angularly in a regular manner along the outer wall of the skirt 80 of the intermediate coupling component 86 and they have a triangular section which becomes thinner from the lower collar 42 to the free upper edge 88 of the skirt 80 so as to form wedges which will progressively penetrate into the material forming the wall of the recess 60 during the first clamping operation.

The teeth 42 are distributed regularly and are spaced by cylindrical portions 90 of the skirt 80.

The axial clamping of the unit is ensured by means of a nut 38, the lower annular clamping face 40 of which cooperates with the upper face 16 of the driving head 10 and which is screwed onto the threaded free end 34 of the motor shaft 12 which protrudes axially beyond the upper face 16.

At the time of the first assembly and clamping operation, the operator performs a tightening of the nut 38 until the teeth 42 penetrate into the wall of the recess 60 and until the radial annular stop surface 23 comes to bear against the upper annular face 84 of the outer radial collar 82 of the intermediate rotational coupling part 56.

Once axial clamping has been performed, the relative axial position of the driving head 10 in relation to the shaft 12 is precisely ensured because of the mutual bearing of the surfaces 23 and 84 and of the surfaces 86 and 36.

The rotational coupling between the intermediate component 56 and the end portion 28 of the shaft 12 is ensured by the cooperation of complementary shapes. For this purpose, the intermediate section 32 of the free end 28 of the motor shaft 12 comprises a series of flat surfaces 92 and it is mounted inside the skirt 90 of the intermediate rotational coupling component 56 which comprises corresponding flat surfaces 94.

In these last two embodiments, and in the event of the driving head being dismantled, the intermediate component 56 remains in position in its seat 60, and angular indexing of the driving head 10 in relation to the shaft 12 is ensured by rotational coupling means 48–68 or 92–94 of the intermediate component 56 with the shaft 12.

What we claim is:

1. A windshield wiper assembly, said assembly comprising:

an elongated, rotatable motor shaft defining a longitudinal axis, said motor shall includes a cylindrical main portion, a first free end portion and a second free end portion, the cylindrical main portion has a first outer diameter and the second free end portion includes means for rotational articulation of said motor shaft by a geared motor unit, said first free end portion includes;

an outer radial collar connected with and adjacent to said main portion, said outer radial collar defining a first cylindrical outer edge surface substantially parallel with said axis and having a second outer diameter greater than said first diameter, and a conical face which defines a radial annular bearing surface, said conical face includes a plurality of teeth projecting therefrom and radially spaced about said conical face;

a cylindrical coupling section connected with and adjacent to said outer radial collar, said coupling section defines a cylindrical, smooth outer surface having a third outer diameter less than said first diameter, wherein said plurality of teeth extend from said outer edge surface to said smooth outer surface;

a threaded cylindrical end section connected with and adjacent to said cylindrical coupling section, said end section having external threads thereon and having a fourth outer diameter less than said first diameter;

a driving head of a windshield wiper arm, said head having first and second substantially parallel faces, said first face has a conical countersinking formed therein which defines a radial stop surface and a second cylindrical outer edge surface substantially parallel with said axis, said second face has a cylindrical bore formed therein which is aligned with and extends into said conical countersinking;

a threaded nut, said nut includes a clamping face;

said free end portion of said shaft is coupled to said driving head, wherein said threaded end section passes through the cylindrical bore to extend from said first face such that the cylindrical coupling section lies within said bore, said threaded nut engages said threaded end section, with said clamping face engaging said first face of said head thus providing axial clamping force such that said teeth are embedded into said conical countersinking and the radial annular bearing surface engages said radial stop surface.

* * * * *